(12) United States Patent
van der Knokke et al.

(10) Patent No.: US 7,316,168 B2
(45) Date of Patent: Jan. 8, 2008

(54) FORCE-SENSING BEARING

(75) Inventors: Henri van der Knokke, Niederwerrn (DE); Rainer Wunderlich, Westendorf (DE); Karin Hauser, Kempten (DE); Roman Hollweck, Friesenried (DE)

(73) Assignee: FAG Kugelfischer AG (DE)

( * ) Notice: Subject to any disclaimer, the term of this patent is extended or adjusted under 35 U.S.C. 154(b) by 61 days.

(21) Appl. No.: 10/535,718

(22) PCT Filed: Nov. 19, 2003

(86) PCT No.: PCT/DE03/03829

§ 371 (c)(1),
(2), (4) Date: Aug. 5, 2005

(87) PCT Pub. No.: WO2004/048913

PCT Pub. Date: Jun. 10, 2004

(65) Prior Publication Data
US 2006/0070460 A1  Apr. 6, 2006

(30) Foreign Application Priority Data
Nov. 23, 2002 (DE) ................. 102 54 814

(51) Int. Cl.
G01L 5/12 (2006.01)
G01L 1/22 (2006.01)
G01L 1/00 (2006.01)

(52) U.S. Cl. ................ 73/862.49; 73/862.68; 73/862.627

(58) Field of Classification Search ........... 73/862.322, 73/862.381, 862.49, 862.541, 862.68, 862.62, 73/862.63
See application file for complete search history.

(56) References Cited

U.S. PATENT DOCUMENTS

| | | | | |
|---|---|---|---|---|
| 4,117,719 A | * | 10/1978 | Schutz | 73/862.541 |
| 4,168,160 A | * | 9/1979 | Stoferle et al. | 73/862.49 |
| 4,175,429 A | * | 11/1979 | Keck | 73/862.68 |
| 4,203,319 A | | 5/1980 | Lechler | 73/862.541 |
| 4,667,521 A | * | 5/1987 | Fuss et al. | 73/862.541 |
| 5,140,849 A | * | 8/1992 | Fujita et al. | 73/593 |
| 5,952,587 A | * | 9/1999 | Rhodes et al. | 73/862.541 |
| 6,596,949 B2 | * | 7/2003 | Stimpson | 177/142 |
| 6,619,102 B2 | * | 9/2003 | Salou et al. | 73/11.07 |

FOREIGN PATENT DOCUMENTS

| | | | | |
|---|---|---|---|---|
| GB | 2113845 A | * | 8/1983 | |
| GB | 2188739 A | * | 10/1987 | |

* cited by examiner

*Primary Examiner*—Michael Cygan
*Assistant Examiner*—Jonathan Dunlap
(74) *Attorney, Agent, or Firm*—Ostrolenk, Faber, Gerb & Soffen, LLP

(57) ABSTRACT

The invention relates to a roller bearing comprising curved running paths, in addition to roller bodies and strain gauge sensors which are arranged between said running paths, said sensors being located in a groove on the outer diameter of the outer ring and/or on the inner diameter of the inner ring. The length of two adjacent strip conductor sections of the strain gauge sensor varies in such a way as to measure the angular position of the roller bodies between the strip conductors.

7 Claims, 3 Drawing Sheets

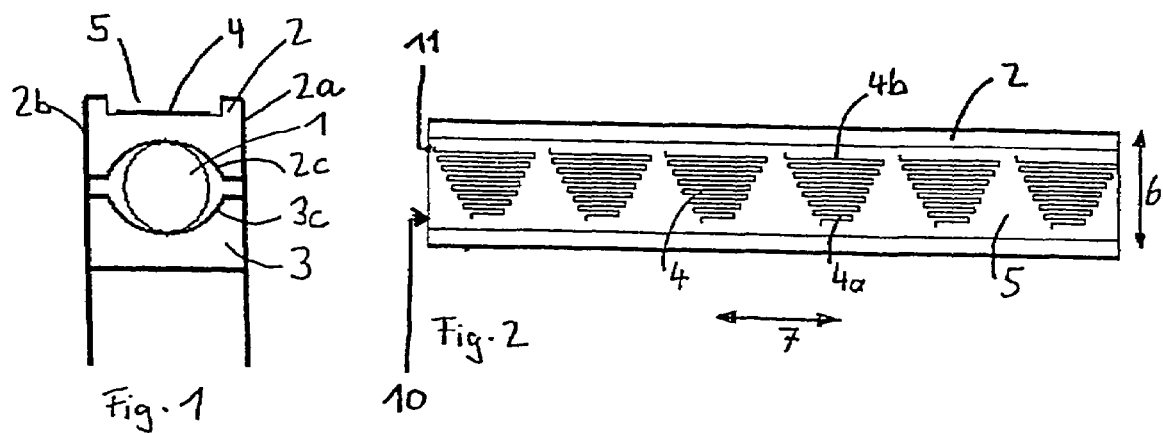
Fig. 1
Fig. 2
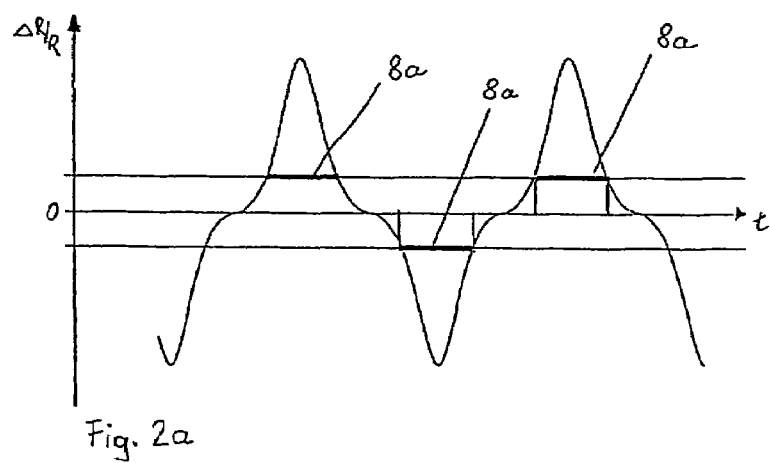
Fig. 2a
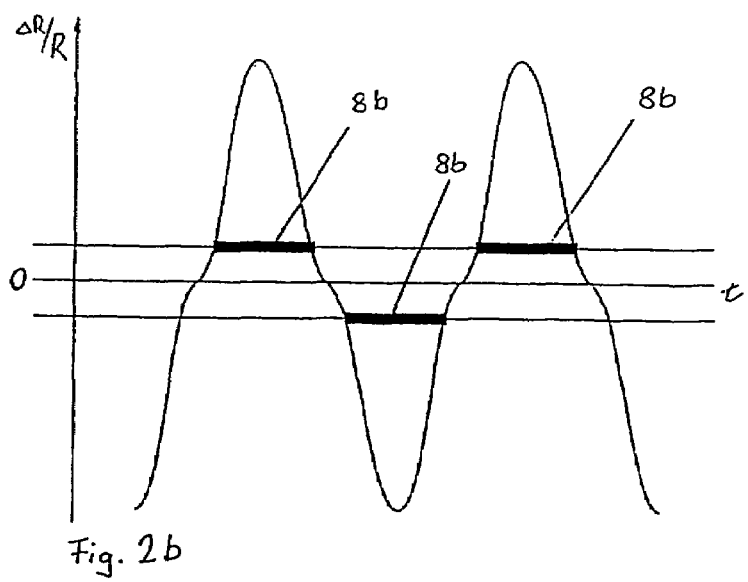
Fig. 2b

FORCE-SENSING BEARING

CROSS REFERENCE TO RELATED APPLICATION

The present application is a 35 U.S.C. §§ 371 national phase conversion of PCT/DE2003/003829 filed 19 Nov. 2003, which claims priority of German Application No. 102 54 814.5 filed 23 Nov. 2002. The PCT International Application was published in the German language.

BACKGROUND OF THE INVENTION

The invention relates to a rolling bearing comprising arranged sensors by means of which the present loading on the rolling bearing can be determined.

U.S. Pat. No. 5,952,587 describes such force-sensing bearings. FIG. 10b of this document illustrates how, in the case of a tapered roller bearing, the force (material elongation) measured by the sensors is divided into radial forces and axial forces. The problem of this solution is that the raceway angle has to be constant in order to decompose the forces into radial and axial forces. For rolling bearings comprising curved raceways, such as e.g. deep-groove ball bearings, the method described cannot be employed to determine the axial or radial forces acting on the rolling bearing with sensors arranged opposite the raceways.

OBJECT OF THE INVENTION

Therefore, the object is to provide a sensor arrangement for rolling bearings comprising curved raceways with which the measured forces can be unambiguously decomposed into axial and radial forces.

SUMMARY OF THE INVENTION

The object is achieved according to the invention.

The essence of the invention consists in arranging sensors (e.g. strain gauge sensors) on the outer diameter of the outer ring or on the inner diameter of the inner ring, which generate time signals of different length in the event of loading (Hertzian compression) of the rings by the rolling bodies depending on the axial position in the raceways of the rolling bearing. The signals of different length are generated by varying the length of two adjacent conductor track sections of the strain gauge sensor that lie in the circumferential direction 7 (FIG. 2). The time signals of different length in the event of loading are thus proportional to the contact angle of the rolling bodies in the raceway of the rolling bearing rings. This arrangement of the strain gauge sensors exploits the effect that, in the case of rolling bearings comprising curved raceways, the rolling bodies move out of the raceway base in the event of a combined radial-axial loading and assume a new equilibrium position outside the raceway base. The higher the axial loading becomes, the further the rolling body moves from the raceway base in the direction of the side area of the rolling bearing. This also results in a shift in the pressure ellipse between rolling bearing ring and rolling body in the axial direction. The pressure ellipse also leads to a length alteration in the circumferential direction 7 in the material of the rolling bearing ring. The sensors, having different widths in the axial direction, thus detect the length alteration in the material—upon the rolling body rolling through—for different lengths. The length of the loading of a sensor can be converted into radial and axial forces through knowledge of the geometry of the rolling bearing.

Since the loading duration of a sensor is also dependent on the rotational speed of the rolling bearing, the rotational speed is determined by means of the time interval required by two adjacent rolling bodies to load a sensor.

Commercially available rectangular strain gauge sensors can be used in the case of this arrangement.

BRIEF DESCRIPTION OF THE DRAWINGS

FIG. 1 is an axial, partial cross-section of a rolling bearing with curved raceways;

FIGS. 2-6 show various sensor arrangements and

FIGS. 2a and b and 3a show the sensed signal with the respective sensors.

DESCRIPTION OF PREFERRED EMBODIMENTS

Figure 3:
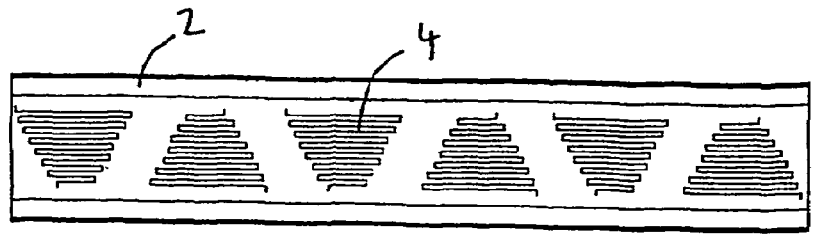

FIG. 1 illustrates a rolling bearing comprising curved raceways (here a deep-groove ball bearing). The rolling body 1 is arranged between the two races 2 and 3. In this illustration, the rolling body is situated precisely in the central position of the rolling bearing. In the event of loading in an axial direction the rolling body migrates in the axial direction toward the other side area 2a or 2b of the rolling bearing, depending on the force direction of the axial forces. In this example, sensors 4 are arranged in a groove 5 on the outer ring 2. The analogous arrangement of the sensors 4 in a groove on the inner ring 3 is not illustrated.

FIGS. 2 to FIG. 5 show special sensor arrangements arranged in the groove 4 on the outer ring 2 and/or on the inner ring 3. In order to better discern the arrangement of the sensors, the rolling bearing races are shown unwound in the illustration. The sensors 4 are illustrated in trapezoidal arrangement here in the preferred embodiment of a strain gauge. The conductor track sections of the strain gauge sensor 4a and 4b, respectively, are embodied with different lengths in the axial direction 6. This illustration shows that a rolling body which moves out of the raceway base in the axial direction 6 loads the sensors 4 for different lengths (of time). The length of the time signal of a sensor is thus proportional to the angular position of the rolling body 1 in the rolling bearing races 2 or 3. Since the sensors 4 are normally connected up to form Wheatstone bridges, the duration of the output signal of the Wheatstone bridge is thus proportional to the contact angle of the rolling body 1 in the raceway of the rolling bearing races 2 or 3. A preferred embodiment in this case is the arrangement of the strain gauge sensors at a distance in the rolling bearing race that corresponds to half the distance between two adjacent rolling bodies.

FIG. 2a illustrates the output signals of the Wheatstone bridge for the case where the rolling body rolls through in the region of the short conductor track sections 4a under the strain gauge sensor. The position of the rolling bodies that roll through under the sensors is identified by the arrow 10. The period duration 8a of the signals is correspondingly short.

FIG. 2b illustrates the output signals of the Wheatstone bridge for the case where the rolling body rolls through in a region of the long conductor track sections under the strain gauge sensor. The position of the rolling bodies that roll through under the sensors is identified by the arrow 11. The period duration 8b of the signals is correspondingly long. The period duration is thus proportional to the angular position of the rolling bodies in the raceway given a known rotational speed of the rolling bearing.

Figure 3A:
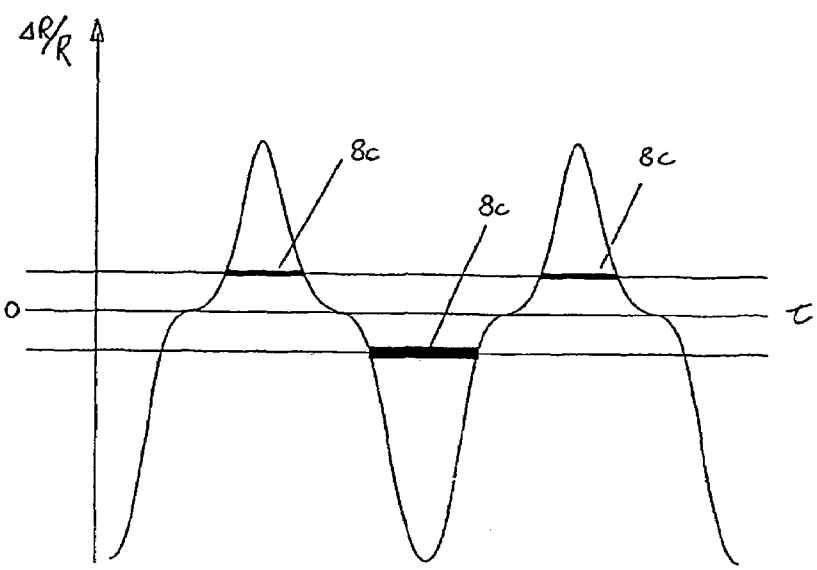

In the sensor arrangement in FIG. 3, the angular position of the rolling bodies in the raceway is determined by averaging the long and short period durations in the output signal of the Wheatstone bridge. FIG. 3a illustrates the output signal of the Wheatstone bridge. The alternate period duration 8c is identified.

Figure 4:
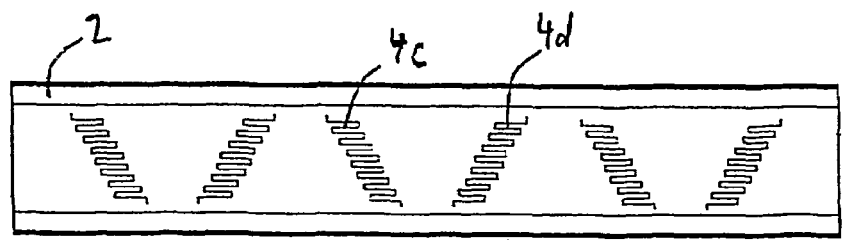
Figure 5:
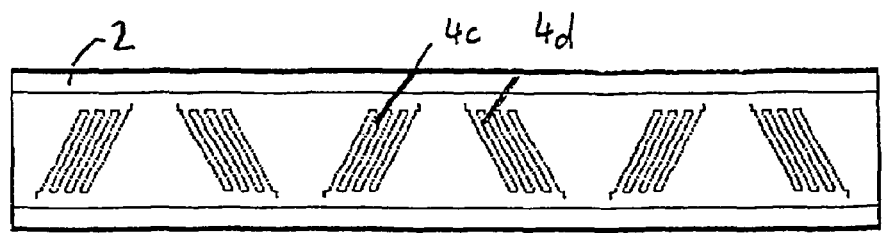

With the sensor arrangements in FIG. 4 and in 5 the time interval between two adjacent sensors 4c, 4d becoming loaded is proportional to the angular position of the rolling body 1 in the raceways 2c, 3c of the rolling bearing races 2 or 3. FIGS. 4 and 5 differ by their differently oriented conductor track sections in the sensors (strain gauge sensors) 4c and 4d. The comparable case with the use of commercially available strain gauge sensors with a right-angled base area is not illustrated.

Figure 6:
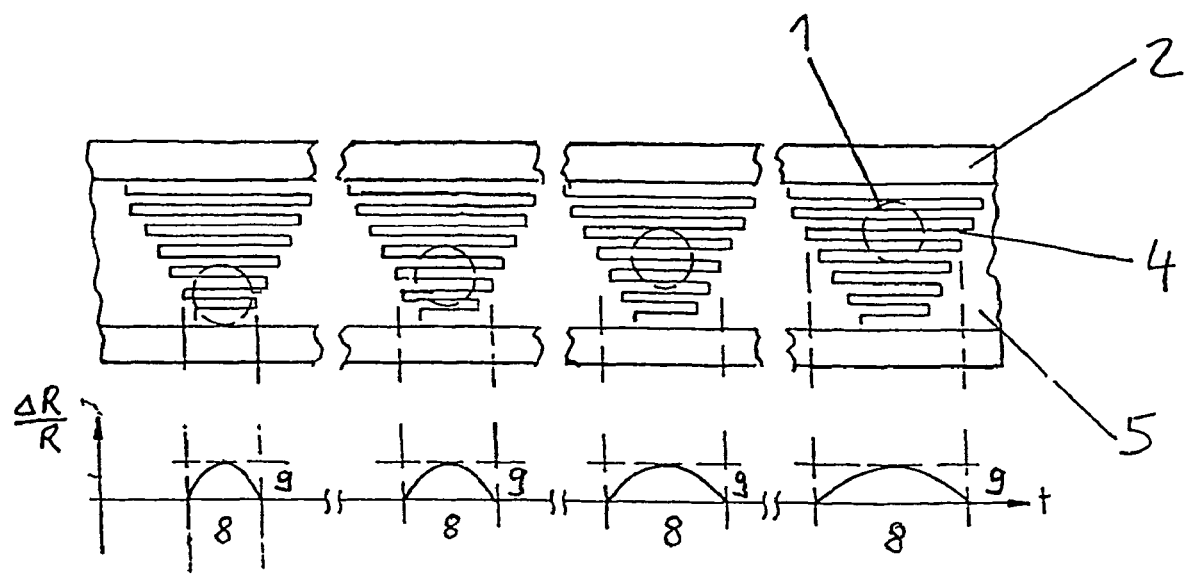

FIG. 6 illustrates a detail from the rolling bearing race with the sensors 4. The rolling body 1 is depicted in different positions in the raceway. The signal determined by the sensor 4 (of a sensor of the Wheatstone bridge) is represented below the detail from the rolling bearing race. The change in the resistance ($\Delta R/R$) in the sensor 4 is plotted on the ordinate of the system of coordinates and time (t) is plotted on the abscissa. The different period duration 8 in dependence on the contact angle of the rolling bodies in the raceway of the rolling bearing races becomes clear in this illustration. The magnitude of the signal 9 is proportional to the loading of the rolling bearing race.

The invention claimed is:

1. A rolling bearing comprising:
   inner and outer rings having opposing, cooperating curved raceways and each ring having an inner and an outer diameter;
   a plurality of rolling bodies arranged between the raceways for rolling along the raceways in a circumferential direction of the bearing rings and the rolling bodies also being movable in an axial direction of the bearing rings upon application of a force to the rings;
   a plurality of strain gauge sensors arranged on at least one of the outer diameter of the outer ring and the inner diameter of the inner ring, wherein each of the strain gauge sensors comprises a plurality of circumferentially extending, conductor track sections arranged in a row of the sections in the axial direction of the bearing rings, and the lengths in the circumferential direction of two adjacent ones of the conductor track sections of the strain gauge sensor differ such that positions of the rolling bodies in the axial direction are detectable by the sensors.

2. The rolling bearing as claimed in claim 1, wherein the row of adjacent conductor track sections are so arranged with respect to each other and are of such lengths that together the sections define trapezoid in each of the plurality of sensors.

3. A rolling bearing comprising:
   inner and outer rings having curved raceways and each ring having an inner and an outer diameter;
   a plurality of rolling bodies arranged between the raceways for rolling along the raceways in a circumferential direction of the bearing rings and the rolling bodies also being movable in an axial direction of the bearing rings upon application of a force to the rings;
   a plurality of sensors arranged on at least one of the outer diameter of the outer ring and the inner diameter of the inner ring, wherein a distance in the circumferential direction between two circumferentially adjacent ones of the sensors on one of the rings varies in the axial direction such that positions of the rolling bodies in the axial direction are detectable by the sensors.

4. The rolling bearing as claimed in claim 3, further comprising a groove in the at least one of the outer diameter of the inner outer ring and the inner diameter of the inner ring and the sensors are arranged in the groove.

5. The rolling bearing as claimed in claim 1, further comprising a groove in the at least one of the outer diameter of the inner outer ring and the inner diameter of the inner ring and wherein the sensors are arranged in the groove.

6. The rolling bearing as claimed in claim 3, wherein the sensors comprise conductor track sections extending in the circumferential direction, the track sections being arrayed in rows in the axial direction, and the distance between two circumferentially adjacent sections varies in axially adjacent rows of the track sections.

7. The rolling bearing as claimed in claim 3, wherein the sensors comprise conductor track sections having a length and being oriented to extend in both the axial and the circumferential directions and the conductor track sections also being oriented such that two of the conductor track sections are spaced apart a varying distance at selected different axial locations on the bearing.

* * * * *